(12) United States Patent
Matsuzawa (10) Patent No.: US 9,947,351 B1
(45) Date of Patent: Apr. 17, 2018

(54) POSITION DETECTING DEVICE FOR DETECTING POSITION IN ACCORDANCE WITH PERIODICALLY ARRANGED INFORMATION, POSITION CONTROL DEVICE, DISK STORAGE DEVICE, AND POSITION DETECTING METHOD

(71) Applicant: Kabushiki Kaisha Toshiba, Minato-ku, Tokyo (JP)

(72) Inventor: Takuji Matsuzawa, Kashiwa Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/678,348

(22) Filed: Aug. 16, 2017

(30) Foreign Application Priority Data

Mar. 16, 2017 (JP) ................................ 2017-051700

(51) Int. Cl.
*G11B 5/55* (2006.01)
*G11B 20/12* (2006.01)

(52) U.S. Cl.
CPC .... *G11B 5/5534* (2013.01); *G11B 2020/1218* (2013.01); *G11B 2020/1265* (2013.01)

(58) Field of Classification Search
CPC . G11B 5/5526–5/5547; G11B 20/1217; G11B 2020/1218; G11B 2020/1224–2020/1225; G11B 2020/1232; G11B 2020/1241; G11B 2020/1264–2020/1267
USPC ............ 360/48–49, 55, 69, 75, 77.01–77.08, 360/78.04, 78.14
See application file for complete search history.

(56) References Cited

U.S. PATENT DOCUMENTS

| | | |
|---|---|---|
| 6,038,097 A | 3/2000 | Le et al. |
| RE39,831 E | 9/2007 | Le et al. |
| 8,804,274 B1 | 8/2014 | Matsuzawa |
| 8,922,921 B1 | 12/2014 | Hebbar et al. |
| 2015/0043099 A1 | 2/2015 | Kawabe et al. |

*Primary Examiner* — Wayne Young
*Assistant Examiner* — James L Habermehl
(74) *Attorney, Agent, or Firm* — White & Case LLP (57) ABSTRACT

According to one embodiment, a position detecting device includes a detecting portion which periodically detects a plurality of pieces of information generated in accordance with positional information divided into upper digits and lower digits. The upper digits are further divided into a plurality of pieces of upper digit information equal to the number of the period. The pieces of the upper digit information are obtained in a predetermined order. The lower digits are obtained simultaneously with any one of the pieces of the upper digit information. The positional information is divided so that the number of values, which are obtainable in one piece of the upper digit information provided by dividing the upper digits, and a division number of the upper digits are coprime.

13 Claims, 8 Drawing Sheets

POSITION DETECTING DEVICE FOR DETECTING POSITION IN ACCORDANCE WITH PERIODICALLY ARRANGED INFORMATION, POSITION CONTROL DEVICE, DISK STORAGE DEVICE, AND POSITION DETECTING METHOD

CROSS-REFERENCE TO RELATED APPLICATIONS

This application is based upon and claims the benefit of priority from Japanese Patent. Application No. 2017-051700, filed Mar. 16, 2017, the entire contents of which are incorporated herein by reference.

FIELD

Embodiments described herein relate generally to a position detecting device, a position control device, a disk storage device, and a position detecting method.

BACKGROUND

A magnetic disk device is one example of disk storage devices. In the field of magnetic disk devices, a higher recording density of a disk as a storage medium is developing.

DETAILED DESCRIPTION

An embodiment will be described below by referring to the accompanying drawings. In the following, constituent components that are approximately or substantially identical will be indicated by the same reference sign, and such constituent components will be explained when needed.

In general, according to one embodiment, a position detecting device includes a detecting portion which periodically detects a plurality of pieces of information generated in accordance with positional information. The positional information is divided into upper digits and lower digits. The upper digits are further divided into a plurality of pieces of upper digit information equal to the number of the period. The pieces of the upper digit information are obtained in a predetermined order. The lower digits are obtained simultaneously with any one of the pieces of the upper digit information. The positional information is divided in a manner that the number of values, which are obtainable in one of the pieces of the upper digit information provided by dividing the upper digits, and a division number of the upper digits are coprime.

A position detecting device according to the present embodiment performs high-accuracy position detection in accordance with a plurality of pieces of information, if periodically obtained, generated based on positional information.

The description of the present embodiment takes, as an example, a case where the position detecting device and a positioning control device according to the present embodiment are applied in a disk storage device. The disk storage device is, for example, a hard disk drive. The position detecting device according to the present embodiment, however, is applicable in various other fields for periodically detecting a plurality of pieces of information generated in accordance with the positional information. The positioning control device according to the present embodiment performs positioning control in accordance with the pieces of information detected by the position detecting device of the present embodiment. The position detecting device and the positioning device according to the present embodiment are applied in the storage device, but may also be applied in other devices. For example, the position detecting device according to the present embodiment can be applied in such a field that positional information is acquired by a sensor, but the range or resolution thereof may change periodically.

The disk storage device according to the present embodiment divides positional information, generates servo information in accordance with the divided information, and stores the generated servo information in a plurality of servo regions (servo frames) which are arranged in a circumference direction. Although the positional information is managed in the divided manner, the disk storage device according to the present embodiment can perform highly accurate seek control.

Figure 1:
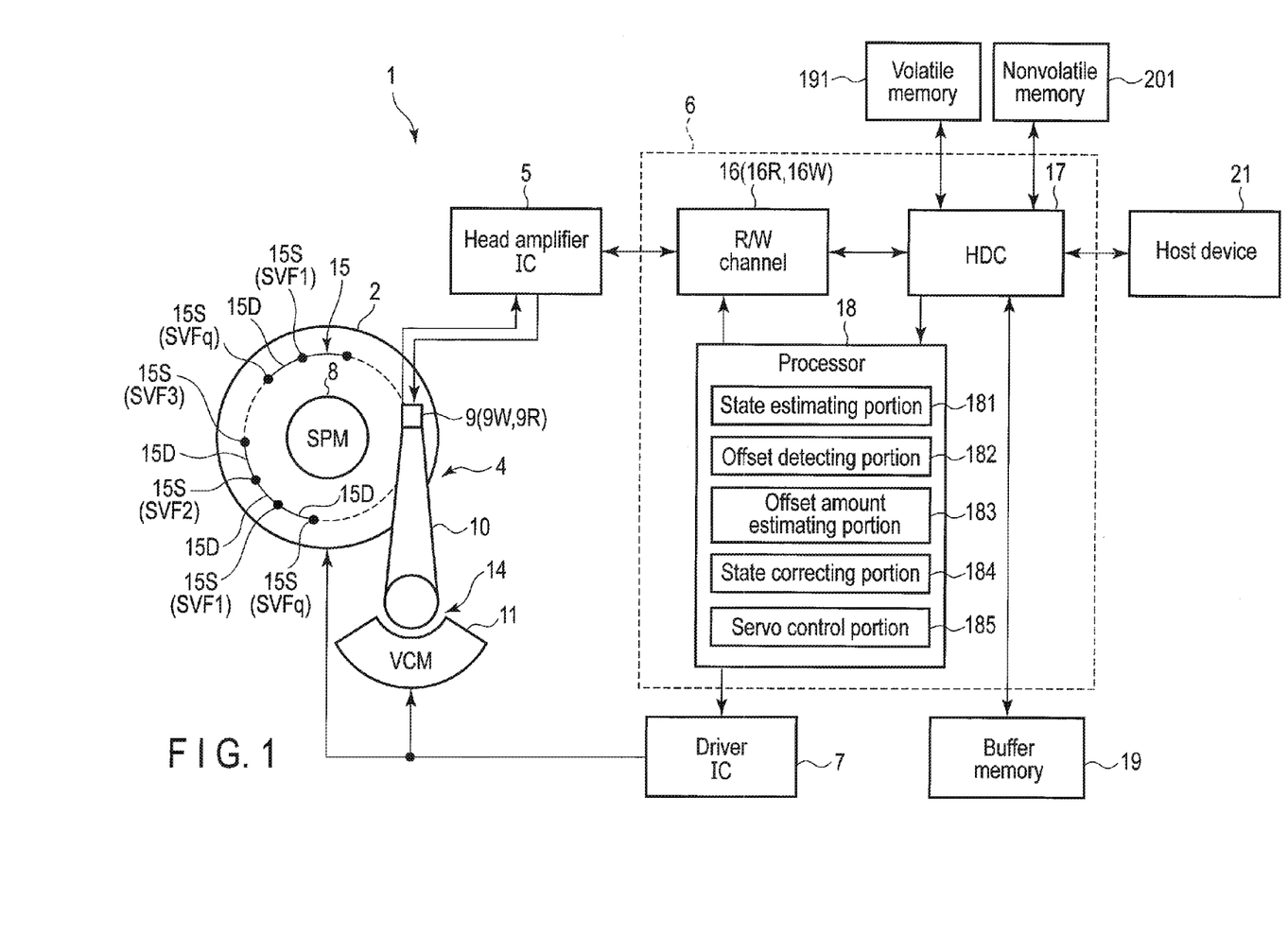
FIG. 1 is a block diagram illustrating a schematic configuration example of a disk storage device according to the present embodiment.

FIG. 1 is a block diagram illustrating a schematic configuration example of a disk storage device 1 according to the present embodiment.

Figure 2:
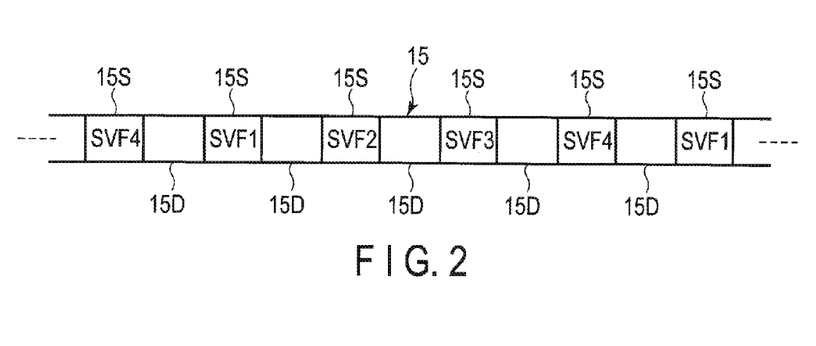
FIG. 2 is a conceptual diagram illustrating an example region of a cylinder included in a disk of the disk storage device.

FIG. 2 is a conceptual diagram illustrating an example region of a cylinder 15 included in a disk 2 of the disk storage device 1.

The disk storage device 1 includes a head-disk assembly (HDA) 4, a head-amplifier integrated circuit (IC) 5, a main controller 6, a driver IC 7, a buffer memory 19, a volatile memory 191, and a nonvolatile memory 201.

The HDA 4 includes a disk 2, a spindle motor (SPM) 8, an arm 10 with a head 9 mounted thereon, and a voice coil motor (VCM) 11. The disk 2 is rotated by the spindle motor 8. The arm 10 and the VCM 11 form the actuator 14 to move (seek) the head 9 to a target position on the disk 2. In other words, the actuator 14 is driven by the VCM 11 to move the head 9, which is mounted on the arm 10, radially on the disk 2. The VCM 11 is driven by a driving current from the driver IC 7.

Although the disk 2 includes many cylinders 15 that store data, one cylinder of the cylinders 15 is illustrated in FIG. 1. The cylinder 15 of the disk 2 includes a plurality of servo regions 15S arranged therein. Each servo region 15S includes block information allocated thereto, the block information being obtained by dividing the positional information according to a rule which is described later. The positional information indicates, for example, a position in a radial direction of the disk 2.

The information allocated to the servo regions is referred to as servo information in the present embodiment. In other words, the servo information is the data to be written to the servo regions and is the data readable from the servo regions.

The head 9 includes a slider as a body portion, and a write head 9R and a read head 9W are mounted on the slider. The read head 9R reads data stored in the cylinder 15 on the disk 2. The write head 9W writes data on the disk 2. The data is, for example, servo information and user data.

The head amplifier IC 5 includes a read amplifier and a write driver. The read amplifier amplifies a read signal, which is read by the read head, and propagates the amplified read signal to a read/write (R/W) channel 16. The write driver transfers a write current corresponding to the write data, which is output from the R/W channel 16, to the write head 9W.

The main controller 6 is, for example, an integrated circuit, including the R/W channel 16, a hard disk controller (HDC) 17, and a processor 18. The main controller 6 may be formed as one-chip. The R/W channel 16 includes a read channel 16R and a write channel 16W. The read channel 16R processes the read signal read by the read head 9R to decode data (including servo information.). The write channel 16W executes signal processing of the write data from the HDC 17.

The HDC 17 controls data transfer between a host device 21 and the R/W channel 16. The HDC 17 controls the buffer memory 19 and the volatile memory 191 and executes data transfer control by temporarily storing the read data and the write data to the buffer memory 19 or the volatile memory 191. The buffer memory 19 and the volatile memory 191 may be implemented, for example, as a dynamic random access memory (DRAM). The HDC 17 controls a flash memory, which is an example of the nonvolatile memory 201, and use the nonvolatile memory 201 as, for example, a cache region for temporarily storing the data.

The processor 18 is, for example a central processing unit (CPU) or a micro processing unit (MPU) that controls the VCM 11 via the driver IC7, and executes positioning control (servo control) of the head 9. Further, the processor 18 controls storage and read of data via the R/W channel 16. The processor 18 may implement various functions according to firmware.

In the present embodiment, the processor 18 includes a state estimating portion 181, an offset detecting portion 182, an offset amount estimating portion 183, a state correcting (offsetting) portion 184, and a servo control portion 185.

The state estimating portion 181 estimates a state including the position of the head 9.

The offset detecting portion 182 detects that a state estimated by the state estimating portion 181 has offset relative to the actual state (real state or current state).

When the offset detecting portion. 182 detects the offset, the offset amount estimating portion 183 estimates an offset amount of the state estimated by the state estimating portion 181.

The state correcting portion 184 corrects the state estimated by the state estimating portion 181 in accordance with the offset amount estimated by the offset amount estimating portion 183.

The servo control portion 185 executes control, such as detection of the position of the head 9, or performing positioning control, in accordance with the state corrected by the state correcting portion 184.

The control for division and recovery of the positional information according to the rules of the present embodiment may be executed by one or a combination of the servo control portion 185, the R/W channel 16, and the HDC 17, or by cooperating at least two of the servo control portion 185, the R/W channel 16, and the HDC 17.

Each cylinder 15 of the disk 2 includes q kinds of (q is an integer at least 2) servo regions 15S arranged periodically at fixed intervals in a circumferential direction. A data region 15D that stores user data is disposed between the servo regions 15S. A plurality of pieces of servo information is stored in the q kinds of servo regions SVF1 to SVFq. The servo information is generated by dividing the positional information into a plurality of pieces of block information and allocating the divided pieces of information to the servo regions SVF1 to SVFq according to a rule. The positional information includes, for example, cylinder information for detecting a cylinder position as the current position of the head 9. The cylinder information includes a cylinder number that identifies the cylinder 15. The positional, information may include track information for detecting, for example, a track position as the current position of the head 9. The track information may include, for example, the track number that identifies the track. Further, the positional information may include sector information for detecting a sector position of the cylinder 15 or in the track. The sector information may include, for example, the sector number for identifying the sector.

Although the present embodiment describes a representative example in which the positional information is the cylinder number, the positional information may also be other information such as the track number or the sector number.

As in the present embodiment, by dividing the cylinder number that identifies a cylinder 15 into a plurality of pieces of block information, and allocating and storing the pieces of block information to and in a plurality of servo regions SVF1 to SVFq of the cylinder 15 according to a certain rule, the size of the each servo region SVF1 to SVFq can be reduced, that is increasing the size of the data region 15D storing the user data for each cylinder 15. Thus, the high storage density of the disk 2 can be achieved.

FIG. 2 illustrates four kinds of servo regions SVF1 to SVF4, where q=4 for convenience, arranged periodically in the cylinder 15, but the value q may be appropriately changed.

Figure 3:
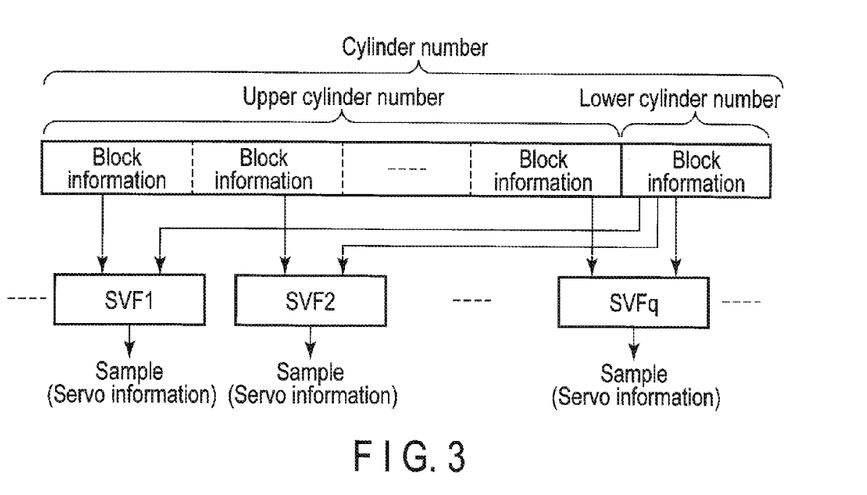
FIG. 3 is illustrates a conceptual diagram illustrating an example relationship between a cylinder number and servo regions SVF1 to SVFq.

FIG. 3 illustrates a conceptual diagram illustrating an example relationship between the cylinder number and the servo regions SVF1 to SVFq.

The cylinder number (positional information) is divided into an upper cylinder number (upper digits) and a lower cylinder number (lower digits). The upper cylinder number, which is divided into q units, and the lower cylinder number are referred to as block information for convenience. The divided q pieces of block information (upper digit information) of the upper cylinder number are allocated to and stored in corresponding q kinds of servo regions SVF1 to SVFq. The block information corresponding to the lower cylinder number is commonly allocated to and stored in the q kinds of servo regions SVF1 to SVFq.

The present embodiment can generate the cylinder number by reading q servo regions SVF1 to SVFq.

(1) Description of State Observer Example

An example of the state observer is described below.

In the disk storage device 1, the processor 18 executes, for example, firmware to perform servo control by allowing seeking of the head 9 and positioning the head 9 at a target cylinder on the disk 2. Then the processor 18 executes read or write of user data to the target cylinder.

When executing the servo control, the processor 18 needs to determine the upper and lower cylinder numbers by reading the pieces of servo information to determine the actual position (actual cylinder number) of the head 9.

In determining the upper cylinder number, the processor 18 reads the q pieces of block information each corresponding to the divided upper cylinder number from the q kinds of servo regions SVF1 to SVFq. Then the processor 18 determines the upper cylinder number by combining the pieces of block information constituting the upper cylinder number. In the following, the determined upper cylinder number may be referred to as "a simply combined position" of the upper cylinder number.

In determining the lower cylinder number, the processor 18 reads the block information corresponding to the lower cylinder number from any one of the q kinds of servo regions SVF1 to SVFq to determine the lower cylinder number.

The processor 18 determines the current cylinder number from the determined upper and lower cylinder numbers.

As described above, when the servo information is stored in the servo regions SVF1 to SVFq on the cylinder 15 and the head 9 seeks at a certain velocity from the current position to the target position, the current position and velocity of the head 9 may not be obtained correctly, causing failure of the seek operation. For example, since the cylinder 15 which the head 9 measures is varying during seeking, the upper cylinder number that has been read in the past may not match the upper cylinder number of the actual cylinder 15 at which the head 9 is currently positioned. In this case, the processor 18 may erroneously determine the current position and velocity of the head 9.

In view of the above, when the servo information is stored in the servo regions SVF1 to SVFq on the cylinder 15 and the head 9 seeks from the current position to the target position, the processor 18 uses a state observer to correctly obtain the actual position and velocity of the head 9 during seeking.

The state observer estimates (predicts) states including, for example, an actual position and an actual velocity. The processor 18 corrects the estimated position and velocity estimated by the state observer in accordance with the estimated position and velocity estimated by the state observer and the positional information obtained from servo regions of each sample, and executes seek control using the corrected estimated position and velocity.

Figure 4:
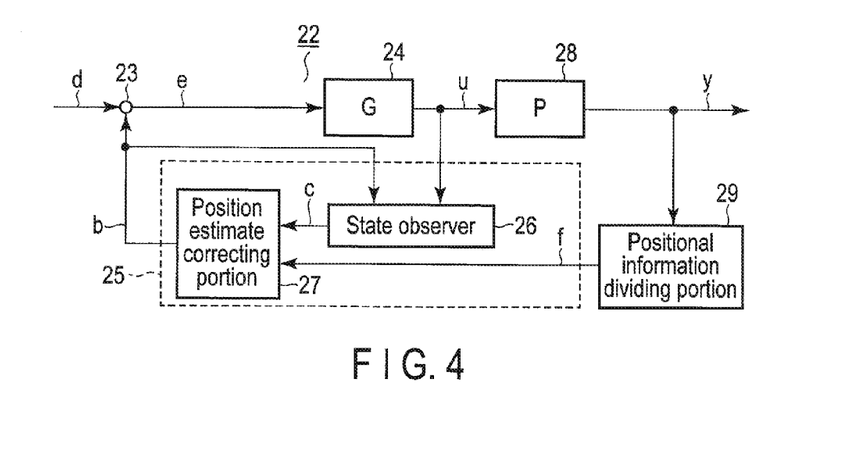
FIG. 4 is a block diagram illustrating an example servo system that generates a corrected estimated position using a state observer.

FIG. 4 is a block diagram illustrating an example servo system 22 that generates a corrected estimated position using the state observer 26.

The servo system 22 executes servo control to position the head 9 at a target position on the disk 2. The servo system 22 may include a processor function of the processor 18 including software, a demodulating function of the R/W channel 16 for demodulating servo information, and a drive control function of the driver IC 7 for controlling the VCM 11.

The VCM 11 and the R/W channel 16 read the servo information from the servo regions SVF1 to SVFq.

The servo system 22 calculates a corrected estimated position b in accordance with the servo information read from the servo regions SVF1 to SVFq and an estimated position c calculated by the state observer 26, and controls the seek operation of the head 9 in accordance with the corrected estimated position b.

The servo system 22 stores servo information, which is read during, for example, the seek operation, in a memory such as the volatile memory 191, a memory not illustrated in the main controller 6, or a memory not illustrated in the processor 18. The servo system 22 determines the occurrence of a state offset which is a difference between the actual position and the estimated position c of the head 9 or a difference between the actual velocity and the estimated velocity. If the occurrence of the state offset is detected, the servo system 22 corrects the estimated position c and the estimated velocity calculated by the state observer 26 in accordance with the servo information stored in the volatile memory 191, the memory not illustrated in the main controller 6, or the memory not illustrated in the processor 18. Hereinafter, in the case the occurrence of the state offset is detected, the corrected estimated position and the corrected estimated velocity will be referred to as "a position-offset-corrected estimated position" and "a velocity-offset-corrected estimated velocity", respectively. The corrected estimated position is regarded as including the position-offset-corrected estimated position. The corrected velocity estimate is regarded as including the velocity-offset-corrected estimated velocity. Further, the position-offset-corrected estimated position and the velocity-offset-corrected estimated velocity are collectively referred to as "a state-offset-corrected estimated state".

When the occurrence of the state offset is detected, the servo system 22 may, for example, calculate an estimated value of the state offset in accordance with the estimated position c and the divided actual position f of the head 9 obtained from the pieces of servo information.

Meanwhile, when the occurrence of the state offset is detected, the servo system 22 may, for example, calculate an estimated value of the velocity offset included in the state offset in accordance with an estimated (predicted) change amount of the state observer 26 and the divided actual position of the head 9 obtained from the pieces of servo information. After calculating the estimated value of the velocity offset, the servo system 22 may calculate the estimated value of the position offset included in the state offset in accordance with the estimated position, the velocity-offset-corrected estimated velocity, which is calculated from the estimated value of the velocity offset and the estimated velocity, and the divided actual position of the head 9 obtained from the pieces of servo information.

The servo system 22 includes a position error arithmetic unit 23, a feedback controller (transfer function G) 24, and an estimated position generating portion 25. The estimated position generating portion 25 includes the state observer 26 and a position estimate correcting portion 27.

The position error arithmetic unit 23 calculates a position error e from the target position d of the head 9 and the corrected estimated position b generated by the position estimate correcting portion 27. The position error arithmetic unit 23 may be implemented by hardware or the processor 18 that executes software.

The feedback controller 24 is, for example, the function realized by the processor 18. The feedback controller 24 outputs a control value u to a plant 28 and the state observer 26 in accordance with the position error e, thus controlling the plant 28 to eliminate the position error e. The plant 28 is the actuator 14 including the VCM 11, and executes control of moving the head 9 to the target position d in accordance with the control value u. The state observer 26 corresponds to, for example, a plant model implemented by the processor 18. The state observer 26 receives the control value u from the feedback controller 24 and the estimated position b corrected by the position estimate correcting portion 27 to calculate the actual estimated position (estimated value) c of the head 9, and outputs the estimated position c to the position estimate correcting portion 27. The position estimate correcting portion 27 calculates the estimated position b corrected in accordance with the output value f of a positional information dividing portion. 29, which represents that the output y from the plant 28 is stored in the servo regions in a manner that the positional information is divided, and the estimated position c estimated by the state observer 26.

As described above, the processor 18 can estimate the state such as the position and velocity by the state observer 26. However, the estimated state may include an error and differ from the correct state of the head 9. The servo system 22 combines the upper cylinder number of the estimated position c of the head 9, which is calculated by the state observer 26, and the lower cylinder number having been read. Further, the servo system. 22 prevents erroneous fixing of the actual position of the head 9 by calculating a lower-estimate-error-corrected estimated position obtained by reflecting the error of the lower cylinder number of the actual position, which occurs due to the estimate error of the state observer 26, in the upper cylinder number. If there is no position offset, the lower-estimate-error-corrected estimated position is equal to the corrected estimated position b. In the following, a calculating method of the lower-estimate-error-corrected estimated position is described on the condition that no state offset is present.

Although the state observer 26 may include the estimate error of several cylinders, the lower cylinder number is obtainable each time the servo information is read. For example, the positional information may be generated by combining the upper cylinder number of the estimated position from the state observer 26 with the lower cylinder number that has been read. Simply combining the upper cylinder number of the state observer 26 with the read lower cylinder number having been read would cause a difference between the upper cylinder number of the state observer 26 and upper cylinder number of the current position, due to the estimate error of the state observer 26. Such a simply combined position, therefore, would not match the actual position of the head 9. Therefore, the processor 18 compares, for example, the lower cylinder number estimated by the state observer 26 with the actual lower cylinder number having been read, and calculates the lower-estimate-error-corrected position estimate by combining the information corrected by adding ±1 to the upper cylinder number estimated by the state observer 26 with the actual lower cylinder number having been read.

For example, assume a case where the estimated position estimated by the state observer 26 is the 31th cylinder (the upper cylinder number 0, the lower cylinder number 31) and the actual position is the 35th cylinder (upper cylinder number 1, the lower cylinder number 3). In this case, if the upper cylinder number estimated by the state observer 26 is simply combined with the actual lower cylinder number having been read, the position would be the 3rd cylinder (the upper cylinder number 0, the lower cylinder number 3) which does not match the actual position of the head 9. In this example, a difference '28' between the lower cylinder numbers is much larger than a design estimate error, indicating that the upper cylinder number of the state observer 26 has been decreased by 1 due to the estimate error. The processor 18, therefore, determines the lower-estimate-error-corrected estimated position by combining a value obtained by adding 1 to the upper cylinder number of the estimated position estimated by the state observer 26 with the actual lower cylinder number having been read. In this example, adding 1 to the upper cylinder number of the estimated position estimated by the state observer 26 is 1, so that the lower-estimate-error-corrected estimated position is the 35th cylinder that matches the actual position.

As described above, when the upper cylinder number is divided into the servo regions SVF1 to SVFq, the estimate error used in correcting the estimate result of the state observer 26 is calculated in accordance with the obtained upper cylinder number portion and the lower cylinder number. However, as far as the stability or the like of seeking is concerned, when the simply combined position of the head 9 is largely deviated from the actual position thereof, it is sometimes better not to use the obtained upper cylinder number portion in calculating the estimate error. For example, if a portion of the upper cylinder number is only obtained, so that upper or lower values of the obtained upper cylinder number remain unknown, a correction of the estimated value calculated by the state observer 26 becomes incorrect. In this case, the state estimated by the state observer 26 may largely change to possibly destabilize the operation of the servo system 22.

Meanwhile, the servo system 22 is not able to correct the estimate error of the upper cylinder number portion by correcting the estimated value of the state observer 26 only with the value of the lower cylinder number. In this case, the upper error occurs by disturbance or the like in the estimated position and velocity estimated by the state observer 26 relative to the actual position and velocity of the head 9. If the estimated position and velocity including such an upper error is used to calculate the lower-estimate-error-corrected estimated position in the estimated position generating portion 25, the upper error is left as the state offset. The state offset means an error between the lower-estimate-error-corrected estimated position and the actual position of the head. As a result of this, the servo system 22 continues the seek operation of the head 9 with the state offset being uncorrected, probably causing inability for the head 9 to reach the target position (target cylinder).

The processor 18, therefore, corrects, during the servo control (seek operation) of the servo system 22, the state offset, which is the error in the lower-estimate-error-corrected estimated position estimated by the estimated position generating portion 25 relative to the actual position of the head 9.

Figure 5:
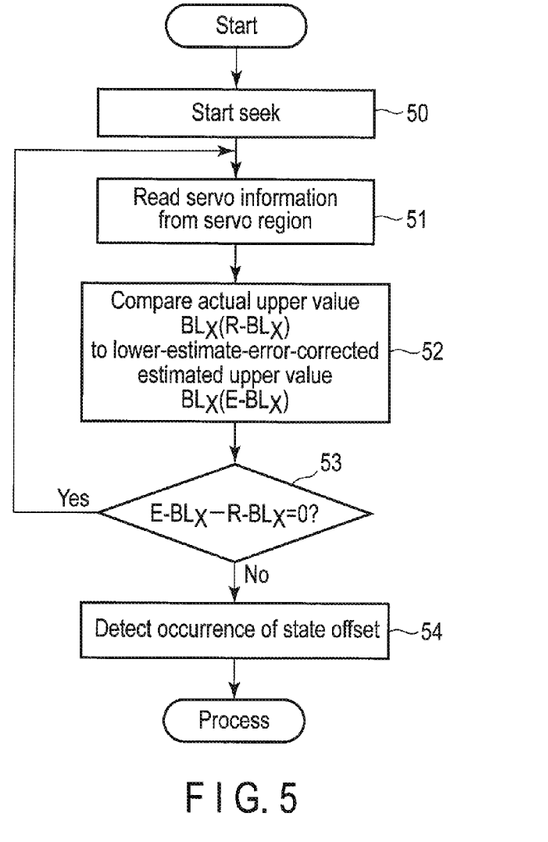
FIG. 5 is a flowchart illustrating processing example from a start of a seek operation until a state offset is detected.

FIG. 5 is a flowchart illustrating processing example from the start of the seek operation until the state offset is detected.

The processor 18 starts the seek operation to move the head 9 from a position on the disk 2 to a target position (target cylinder number) (block 50). The processor 18 reads servo information from the servo regions SVF1 to SVFq during the seek operation (block 51). At this time, the servo information of the servo region SVF1 to SVFq may be read from different cylinders rather than the same cylinder. The servo information is read by the read head 9R from the servo regions SVF1 to SVFq, and demodulated by the read channel 16R. The processor 18 stores the servo information read from the servo regions SVF1 to SVFq in a memory. The memory may be provided in the processor 18 or the main controller 6, or provided as the buffer memory 19, the volatile memory 191, or the nonvolatile memory 201.

The processor 18 compares the block information (actual upper value) included in the actual upper cylinder number having been read with the block information (a lower-estimate-error-corrected estimated upper value) corresponding to the actual upper value of the upper cylinder number at the lower-estimate-error-corrected estimated position (block 52). In other words, the processor 18 compares the actual upper value BLx(R-BLx) (x=1 to q) included in the actual position of the head 9 having been read with the lower-estimate-error-corrected estimated upper position BLx(E-BLx) included in the lower-estimate-error-corrected estimated position and also corresponding to the actual upper value.

If there is no error between the actual upper value and the lower-estimate-error-corrected estimated upper value, the processor 18 determines that the state offset does not occur and continues reading the servo information from the next cylinder (YES at block 53). On the contrary, the processor 18 detects the occurrence of the state offset if the error is present (NO at block 53, block 54).

Figure 6:
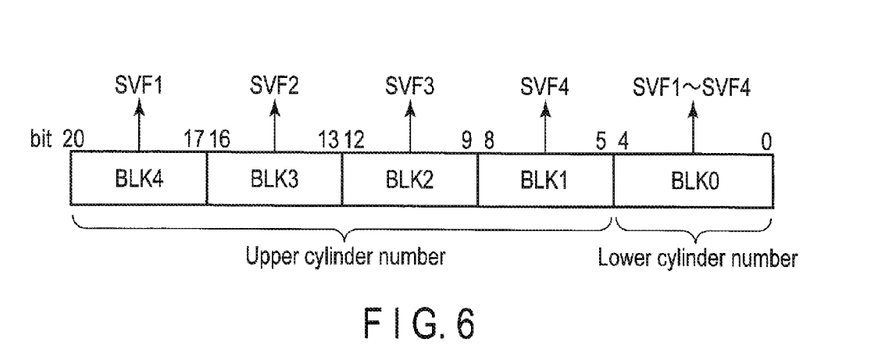
FIG. 6 illustrates a configuration example of a cylinder number.

FIG. 6 illustrates a configuration example of the cylinder number. For simplifying the explanation, in FIG. 6, the upper cylinder number is divided into four blocks and the cylinder number is expressed by bit 0 to bit 20 in ascending order. The number of divided blocks of the cylinder number and the number of bits of the cylinder number may change.

The lower cylinder number is a value expressed by bit 0 to bit 4, and the value expressed by bit 0 to bit 4 is expressed as block information BLK0. The lower cylinder number is stored in each of the servo regions SVF1 to SVF4.

The upper cylinder number is divided into four blocks of bit 5 to bit 8, bit 9 to bit 12, bit 13 to bit 16, and bit 17 to bit 20. Values expressed by bit 5 to bit 8 are expressed as block information BLK1. The block information BLK1 is stored in the servo region SVF4. A value expressed by bit 9 to bit 12 is expressed as block information BLK2. The block information BLK2 is stored in the servo region SVF3. A value expressed by bit 13 to bit 16 is expressed as block information BLK3. The block information BLK3 is stored in the servo region SVF2. A value expressed by bit 17 to bit 20 is expressed as block information BLK4. The block information BLK4 is stored in the servo region SVF1.

Block 54 of FIG. 5 is described when the cylinder number is configured as illustrated in FIG. 6. The processor 18 can obtain the lower cylinder number or the block information BLK0 every time the servo regions SVF1 to SVF4 are read.

When the cylinder number is divided, the position offset of 32 n cylinder and the velocity offset of 32 m cylinder/sample occur as the state offset, where n, m is an integer other than 0. When the state offset occurs, a difference is generated between the actual upper value obtained by reading the servo information and the lower-estimate-error-corrected estimated upper value calculated by the estimated position generating portion 25, which is part of the lower-estimate-error-corrected estimated position corresponding to the actual upper value.

To detect the state offset, the processor 18 compares the actual upper value obtained from the servo information read in the seek operation with the lower-estimate-error-corrected estimated upper value in the lower-estimate-error-corrected estimated position corresponding to the actual upper value for each servo region (or sample). Take the servo region SVF1 as an example, the block information BLK4 (bit 17 to 20) is obtained from the disk 2. The processor 18 compares the obtained block information BLK4 with the block information BLK4 corresponding to the lower-estimate-error-corrected estimated position. If the result is not zero, it is determined that the state offset has occurred.

Figure 7:
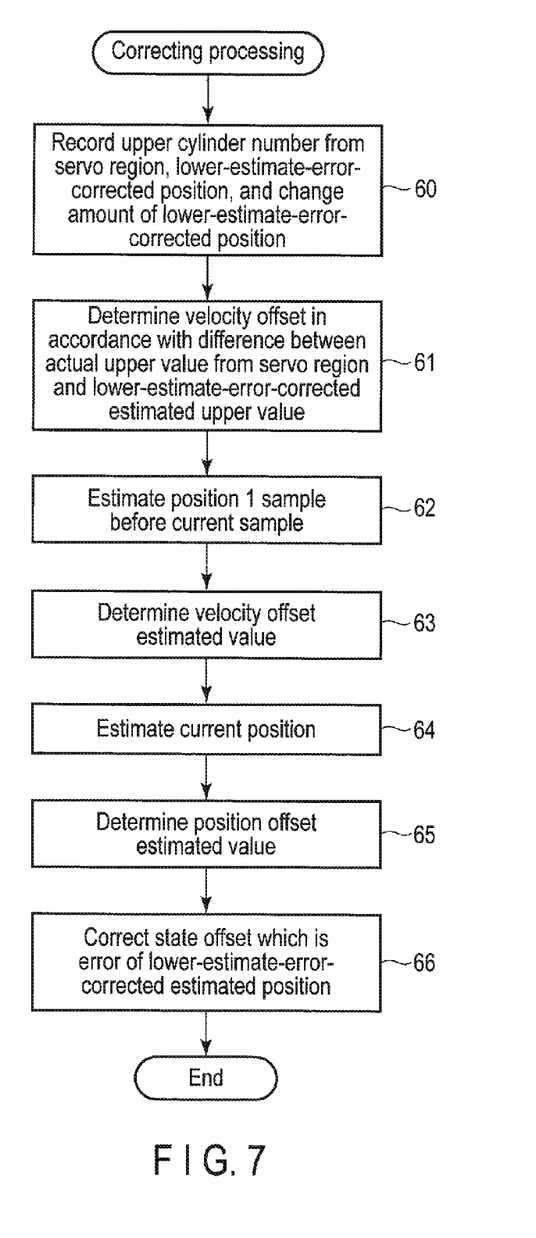
FIG. 7 is a flowchart illustrating an example of state offset correcting processing.

FIG. 7 is a flowchart illustrating an example of state offset correcting processing. The processing of FIG. 7 is executed, for example, when the state offset is detected in the processing of FIG. 5. In the following description of FIG. 7, the cylinder number is configured as illustrated in FIG. 6, but the cylinder number may be freely changeable.

After the state offset (position offset and velocity offset) has occurred, the processor 18 reads at least two sets of servo information (samples) from the servo region for determining the state offset. That is, the servo region for determination is arranged periodically, and the processor 18 reads at least two sets of servo information from at least two positions of the periodically-arranged servo region for determination. The processor 18 thus obtains the upper cylinder number, the lower-estimate-error-corrected estimated position, and a change amount of the lower-estimate-error-corrected estimated position from at least two servo regions, and stores them in the memory (block 60).

As used herein, the servo region for determination means the servo region capable of discriminating between the position offset and the velocity offset in accordance with the error between lower-estimate-error-corrected estimated upper position, which is included in the lower-estimate-error-corrected estimated position, and the actual upper value read from the servo information. Specifically, as illustrated in FIG. 6, the servo region for determination is the servo region SVF4, for example, from which the block information BLK1 included in the upper cylinder number can be read. For example, assume that an error between the lower-estimate-error-corrected estimated upper value and the actual upper value read from the servo region at certain time point is expressed as diff0, and that a corresponding error of the sample located four samples (i.e., one cycle consisting of the servo regions SVF1 to SVF4 arranged periodically) before the current sample is expressed as diff4. In accordance with the current error diff0 and the error diff4, the processor 18 determines the occurrence of the position offset if the difference between the error diff0 and the error diff4 is zero, while determining the occurrence of the velocity offset if the difference is not zero (block 61).

When the velocity offset has occurred, the processor 18 waits until after a specified servo region is read twice after the occurrence of the velocity offset. If the specified servo region has already been read twice when the servo region for determination is read twice, the following processing is performed in the servo region for determination. The servo region subjected to this processing is referred to as "a processing servo region".

As used herein, the specified servo region means the servo region for reading the block information included in the upper cylinder number that should be evaluated for determining the velocity offset in accordance with a certain velocity offset that has probably occurred. Specifically, the specified servo region is, for example, the servo region SVF3, as illustrated in FIG. 6, capable of reading the block information BLK2 included in the upper cylinder number. For example, if the velocity offset of 32 cylinder/sample has occurred, the value of the block information. BLK1 increases by 4 in four samples, but this cannot be discriminated from the case of a decrease of 12. That is, it is not possible to discriminate between the velocity offset of the 32 cylinder/sample and the velocity offset of the −96 cylinder/sample by the comparison of only the block information BLK1. To enable the discrimination, it is necessary to evaluate the block information BLK2, so that the servo region SVF3 can be designated as the specified servo region.

The processor 18 calculates a corrected change amount of the lower-estimate-error-corrected estimated position, which is obtained by correcting a change amount of the lower-estimate-error-corrected estimated position by a change amount of the velocity offset, for possible all operation offset. The processor 18 estimates the block information included in the actual upper cylinder number according to the cylinder number, which is obtained by reading the block information in order from the block information on the lower block side till the block information obtained from the processing servo region, and the corrected change amount of the lower-estimate-error-corrected estimated position. Further, the processor 18 estimates the position of the sample located one sample before the current sample according to the estimated actual position and the corrected change amount of the lower-estimate-error-corrected estimated position (block 62). In other words, the processor 18 estimates the position when the block information BLK2 included in the upper cylinder number is read for the second time from the specified servo region SVF3.

Subsequently, the processor 18 estimates the position when the specified servo region SVF3 is read for the first time, in accordance with the estimated position and the corresponding corrected change amount of the estimated position when the specified servo region is read for the second time as mentioned above. The processor 18 compares the estimated position with the corresponding actual position to determine the velocity offset amount at which the same comparison result is obtained as a true velocity offset estimated value (block 63).

The processor 18 calculates the position offset amount in accordance with the estimated position (current position), which is estimated using the true velocity offset estimated value, and the lower-estimate-error-corrected estimated position calculated by the estimated position generating portion 25. The processor 18 estimates the position (current position) in accordance with values sequentially read from the servo regions of the block information in order from the block information obtained in the specified servo region to the uppermost block information, the estimated cylinder number of the lower block, and the corrected change amount of the lower-estimate-error-corrected estimated position over time from the time when the servo region of each block is read to the current time (block 64). The processor 18 determines the position offset value in accordance with the estimated position and the lower-estimate-error-corrected estimated position calculated by the estimated position generating portion 25 (block 65). Subsequently, the processor 18 corrects the state offset, which is the error of the lower-estimate-error-corrected estimated position calculated by the estimated position generating portion 25, by reflecting (adding) the determined position offset value and the velocity offset estimated value to the state (estimated position) of the state observer 26 (block 66).

As far as the correction of the position offset is concerned, if the position of the head 9 is largely changed during seeking, the state of the state observer 26 or the current through the VCM 11 would become vibrational, and causes inconvenience, such as a larger seek sound. It is possible, therefore, to correct only the velocity offset and change the estimated position of the state observer 26 to the target value. After that, the seeking is re-started to the target value. Even when the position offset is not corrected, the estimate of the future state by the state observer 26 requires consideration of the estimated value of the position offset.

When the disk drive changes its storage frequency of the servo information corresponding to zones on the disk 2, an earlier switching by the R/W channel 16 is required in accordance with the state obtained by the state observer 26 corresponding to the switching of the storage frequency. The above-described processing may be performed for conceivable all velocity offset in the specified servo region.

As described above, the state observer 26 is used to correctly obtain the actual position or the actual velocity during seeking when the cylinder number is divided and stored in the servo regions SVF1 to SVFq. The servo system 22 generates the estimated position corrected in accordance with the estimated position obtained by the state observer 26 and the servo information having been read. In this case, it would be possible that the state offset, which is the error between the lower-estimate-error-corrected estimated position and the actual position or between the estimated velocity and the actual velocity of the state observer 26, occurs due to the factors including the disturbance like an external vibration. When such a state offset occurs, an accuracy of the seek control may decrease and the head 9 would not reach the target position. The estimated error of the state observer 26 can be corrected by feedback to the state observer 26. If, however, the state observer 26 estimates the position and, velocity using only the lower cylinder number, the state offset occurring in the upper cylinder number has reached. Accordingly, a state offset estimating function and an estimated value correcting function using the estimated state offset are necessary since it is not possible to correct the state offset occurring in the upper cylinder number. The correcting function may, for example, detect and correct the state offset by comparing, over the past information, the obtained servo information with the information estimated by the state observer 26.

(2) Description of State Offset and Division Number

A relationship between the state offset and a division number will be described below.

As described above, even when the state offset occurs, the accuracy of the seek control can improve by correcting the estimated position and velocity of the state observer 26. A correctable range of the estimated value of the state offset depends on how the positional information including the cylinder numbers are divided.

In the following, therefore, the division of the cylinder number for effectively correcting the estimated position and velocity generated by the state observer 26 is described.

Figure 8:
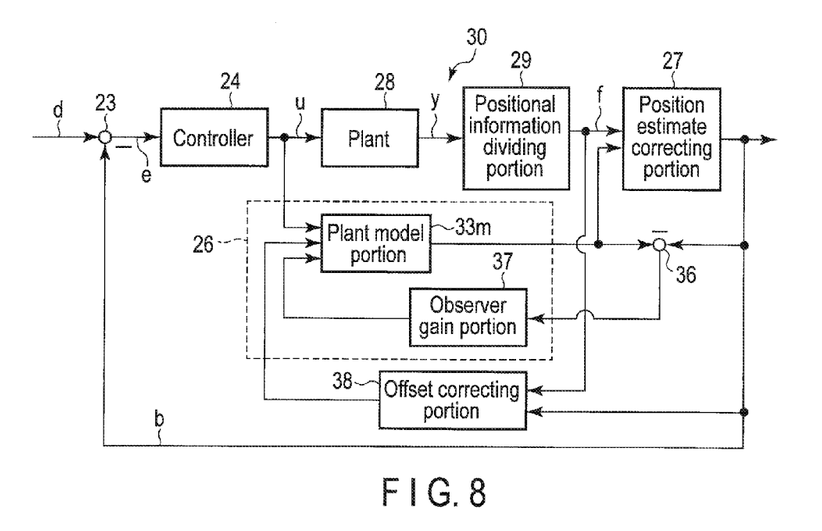
FIG. 8 is a block diagram illustrating an example servo system according to the present embodiment.

FIG. 8 is a block diagram illustrating an example servo system 30 according to the present embodiment.

The servo system 30 is implemented by, for example, the main controller 6 and the actuator 14. The main controller 6 includes the first error arithmetic unit 23, the feedback controller 24, the state observer 26, the position estimate correcting portion 27, a second error arithmetic unit 36, and an offset correcting portion 38. The state observer 26 includes a plant model portion 33m and an observer gain portion 37. The first error arithmetic unit 23, the feedback controller 24, the state observer 26, the position estimate correcting portion 27, the second error arithmetic unit 36, and the offset correcting portion 38 may be implemented by the processor 18 by executing firmware, or implemented by hardware.

The first error arithmetic unit 23 calculates a position error e between the target position d of the head 9 and the estimated position b estimated by the position estimate correcting portion 27.

The feedback controller 24 is, for example, the control function implemented by firmware that is executed by the processor 18.

The plant 28 is the actuator 14 including the VCM 11 and performs the seek operation according to the control by the feedback controller 24.

The plant model portion 33m estimates the operation of the plant 33. The plant model portion 33m and the observer gain portion 37 correspond to the state observer 26. The plant model portion 33m calculates, for example, the estimated state in accordance with the offset correction value from the offset correcting portion 38, the control value u from the controller 32, the gain value (an error-adjusted value between the estimated position and the actual position) from the observer gain portion 37.

The positional information dividing portion 29 represents division of the positional information. The positional information dividing portion 29 represents a division rule itself according to the present embodiment described below.

More specifically, the positional information dividing portion 29 divides the positional information, which is more specifically the upper cylinder number, in such a manner that the division number q and the number of values obtainable in one block of the block information BLK1 to BLKq (which is hereinafter referred to as the upper block information) included in the upper cylinder number become coprime. One example of the division number q that satisfies this condition is an odd number.

If lower side digits (lower portion) of the first block information included in the positional information overlap upper side digits (upper portion) of the second upper block information located one block lower than the first upper block information, then the upper block information may be divided in a manner that the greatest common divisor of the division number and the number of values obtainable in one block of the upper block information becomes not larger than a base to the power of the number of overlapping digits.

If the lower-side bit of the first upper block information overlaps the upper-side bit of the second upper block information located one block lower than the first upper block information, the upper block information may be divided in a manner that the greatest common divisor of the division number and 2 to the power of the number of bits of the upper block information is not larger than 2 to the power of the number of the overlapping bits.

The R/W channel 16, the HDC 17, or the processor 18 may include the reading function to read the positional information which is divided as indicated in the positional information dividing portion 29. The reading function to read the positional information which is divided as indicated in the positional information dividing portion 29 may also be included in the main controller 6 or provided outside of the main controller 6.

The position estimate correcting portion 27 estimates (combines) the actual position in accordance with the divided positional information and the estimated position obtained by the plant model portion 33m in the state observer 26.

The second error arithmetic unit 36 calculates the error between the estimated position obtained by the plant model portion 33m and the actual position estimated by the position estimate correcting portion 27.

The observer gain portion 37 adjusts or, for examples, amplifies the error calculated by the second error arithmetic unit 36.

The offset correcting portion 38 detects an offset between the divided positional information as indicated by the positional information dividing portion 29 and the actual position estimated by the position estimate correcting portion 27, estimates the offset, and corrects the offset to determine the offset correcting value. The offset correcting value is used in the processing of the plant model portion 33m.

When the configuration as illustrated in FIG. 8 is used, a correctable range of the velocity offset is affected by the division number of the positional information or the like.

In the present embodiment, the offset correcting portion 38 is provided separately from the state observer 26, so that the offset correcting portion 38 can be used to correct the state offset by dividing the positional information into an appropriate number suitable for correcting the velocity offset.

The present embodiment is described by taking an example case where the positional information is in the binary format. However, the base of the positional information is freely changeable, and the positional information thereof is not limited to the binary format.

Figure 9:
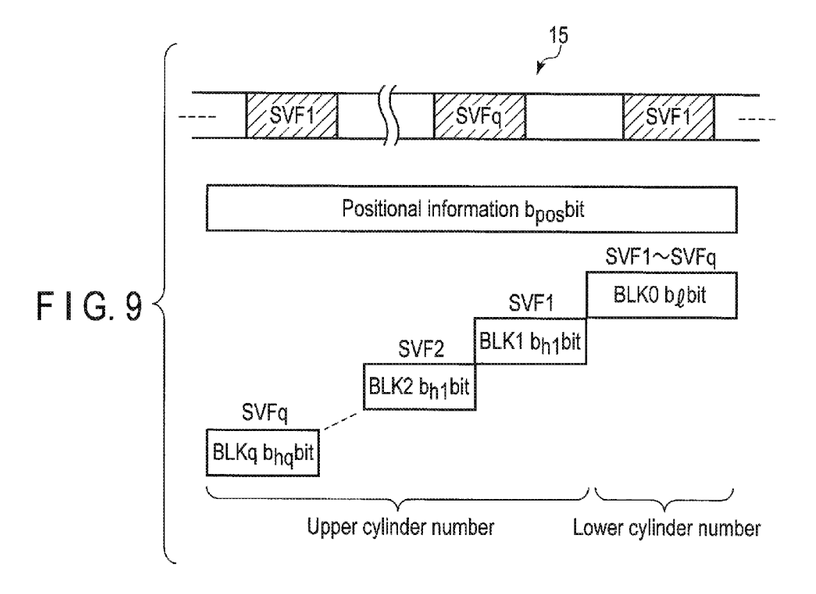
FIG. 9 is a conceptual diagram illustrating an example division of positional information according to the present embodiment.

FIG. 9 is a conceptual diagram illustrating an example division of the positional information according to the present embodiment.

The positional information consists of bpos bits. The positional information is divided into multiple pieces of block information. In FIG. 9, the division number is q+1. The pieces of block information are expressed as BLK0, . . . , BLKq. The lower cylinder number corresponds to the BLK0. The upper cylinder number corresponds to the BLK1 to BLKq. In FIG. 9, the number of bits included in the block information BLK0, BLK1, to BLKq is b1, bh1 to bhq, respectively.

The block information BLK0 constituting the lower cylinder number is included in all the servo regions SVF1 to SVFq. Thus, the main controller 6 can obtain the block information BLK0 every time the data is read from any one of the servo regions SVF1 to SVFq.

Each block information BLK1 to BLKq which constitutes the upper cylinder number is included in the servo regions SVF1 to SVFq corresponding to the block information BLK1 to BLKq.

For simplifying the explanation, bit numbers bh1 to bhq of the block information BLK1 to BLKq that constitute the upper cylinder number are bit number bh in the following description. However, the bit numbers bh1 to bhq are freely changeable. The lowest bit of the individual block information BLK1 to BLKq is bi:=b1+(i−1)bh.

A velocity offset occurs $$2^{b1}n, n \in Z$$

where Z is an integer. For convenience, the velocity offset also includes the velocity offset which has not occurred (n=0). When the velocity offset occurs, a deviation between the upper cylinder number included in the estimated positional information estimated by the state observer 26 and the upper cylinder number included in the actual positional information becomes large over time.

To detect and correct the velocity offset, a difference between the block information BLK1 included in the estimated positional information of the state observer 26 and the block information BLK1 included in the actual positional information is calculated. Then, the change over time between the difference and a corresponding difference similarly calculated q samples before the current sample is considered.

The change of the difference over time is described by taking the block information BLK1 as an example. For example, assume that a first difference is a difference between the block information BLK1 included in the estimated positional information of the k-th sample and the block information BLK1 included in the actual positional information (e.g., a demodulation position or an actual measurement position). Also assume that a second difference is a difference between the block information BLK1 included in the estimated positional information of the (k-q)-th sample and the block information BLK1 included in the actual positional information. The change of the difference over time is a value obtained by subtracting the second difference from the first difference.

The value of the change of the difference over time should be qn, but the block information BLK 1 is bh bit, and the number of values expressed by the block information BLK1 is $$2^{bh}$$

The actual change of the difference over time, therefore, can be obtained only as a remainder of the division of qn by $$2^{bh}$$

To detect the velocity offset having the largest possible range as a result of the comparison of the block information BLK1, $$gcd(q, 2^{bh}) = 1$$

That is, the division number is an odd number.
Assume that $$n = 2^{bh}\alpha + \beta, 0 \le \beta < 2^{bh}$$

then qn becomes $$qn = q(2^{bh}\alpha + \beta) \equiv q\beta (\mathrm{mod} 2^{bh})$$

However, when $$gcd(q, 2^{bh}) = 1$$

qn becomes $$qn = q\beta(\mathrm{mod} 2^{bh}) \Rightarrow n \equiv \beta(\mathrm{mod} 2^{bh})$$

Thus, the change of the difference over time can determine $$2^{bh} \text{ Changes}$$

When $$gcd(q, 2^{bh}) \ne 1$$

it is expressed by the following equation $$q = gcd(q, 2^{bh})\gamma, 2^{bh} = gcd(q, 2^{bh})\delta$$

$$\beta = \delta\epsilon + \zeta, 0 \le \zeta < \delta$$

and $$qn = q\beta(\mathrm{mod} 2^{bh}) \Rightarrow \gamma n \equiv \gamma\beta \equiv \gamma\zeta(\mathrm{mod}\delta)$$

$$\gamma n \equiv \gamma\zeta(\mathrm{mod}\ \delta) \Rightarrow n \equiv \zeta(\mathrm{mod}\ \delta)$$

Thus, only δ changes of difference over time can be determined.

Figure 10:
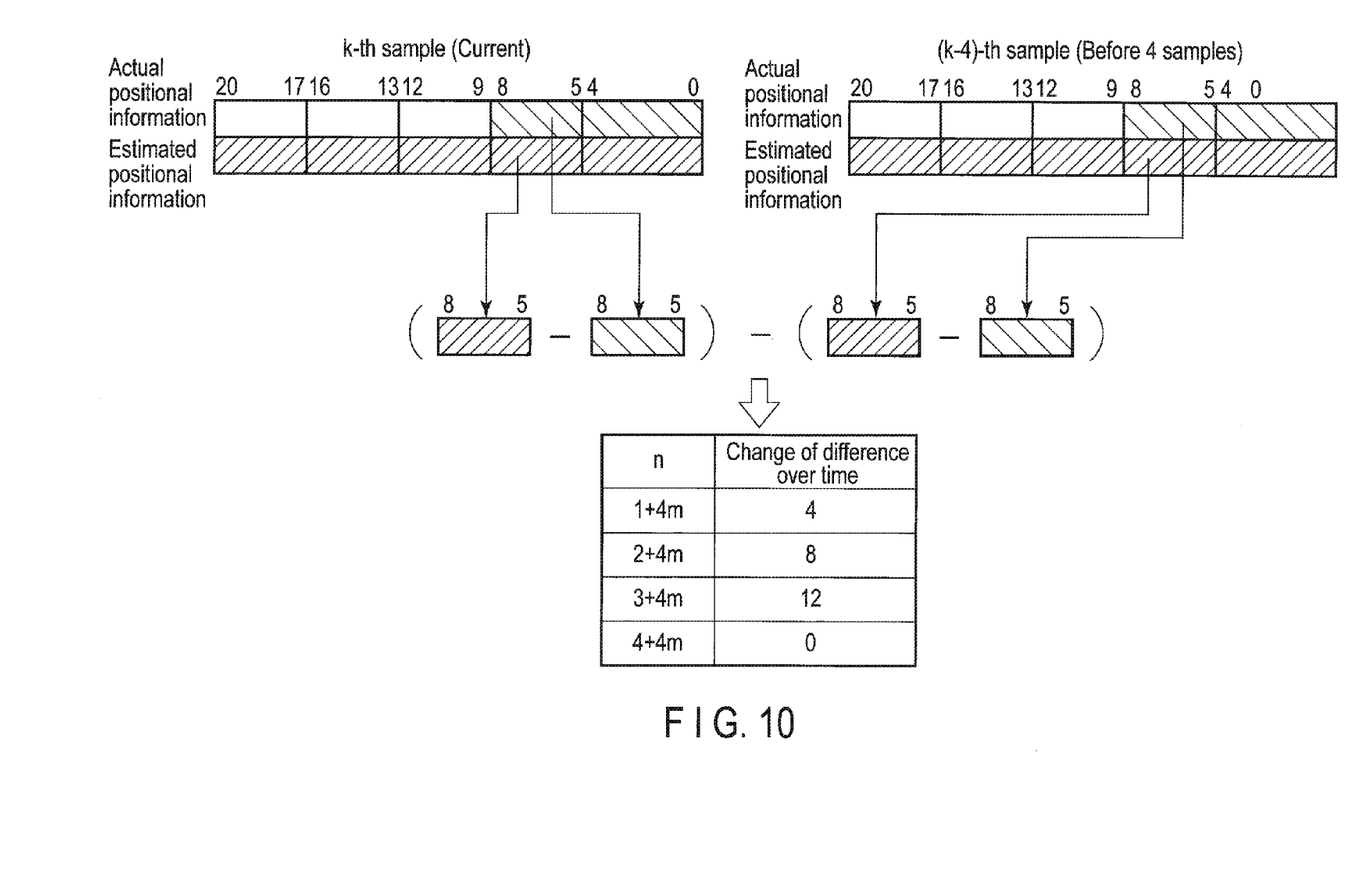
FIG. 10 is a conceptual diagram illustrating a detection example of a velocity offset as a comparative example.
Figure 11:
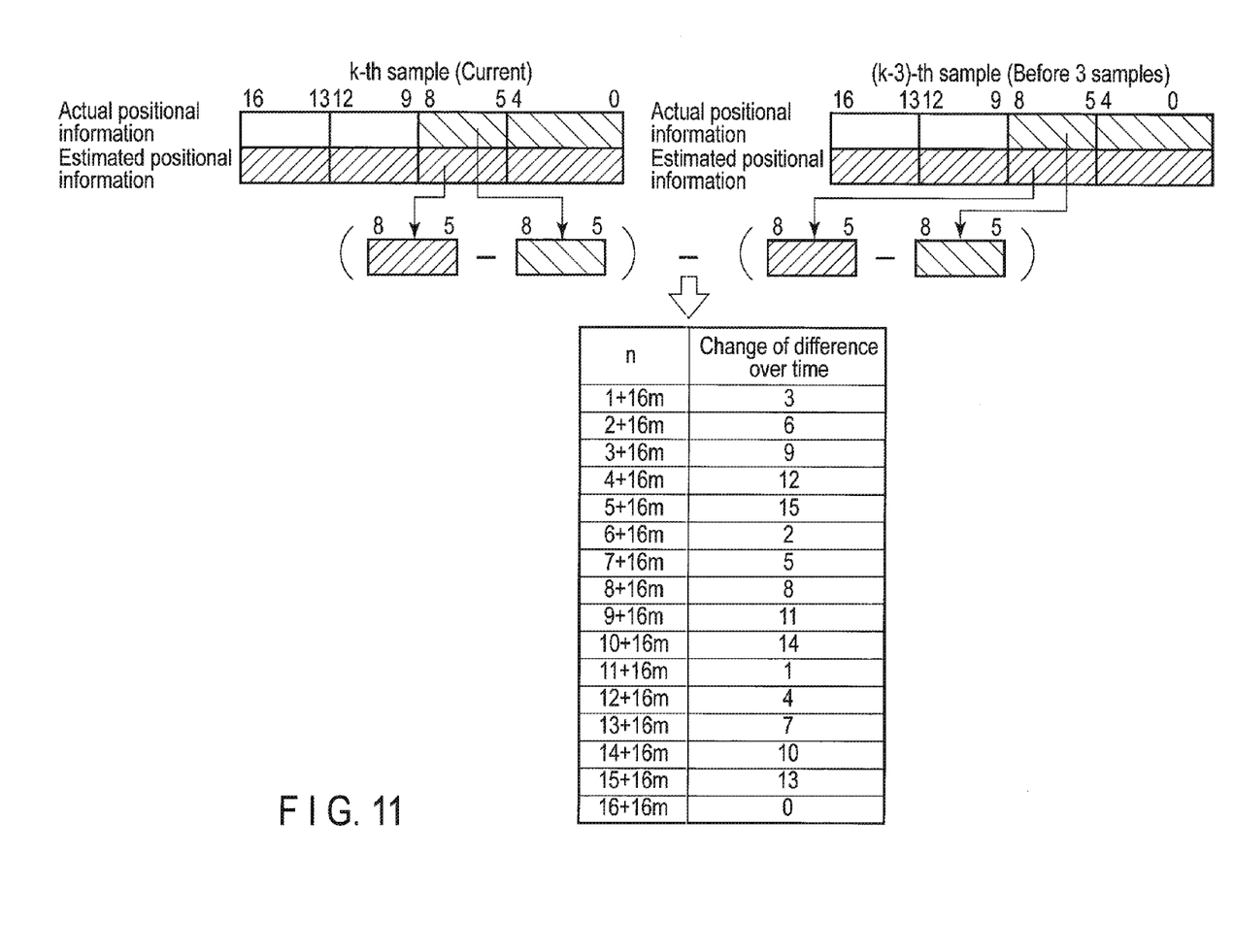
FIG. 11 is a conceptual diagram illustrating a detection example of the velocity offset according to the present embodiment.

An example range capable of being determined using FIGS. 10 and 11 is described below.

FIG. 10 is a conceptual diagram illustrating a detection example of the velocity offset as a comparative example. FIG. 10 illustrates an example case where the positional information from bit 0 to bit 20 is divided into five pieces of block information. For example, a first difference is determined by subtracting the block information BLK1 included in the actual positional information from the block information BLK1 included in the estimated positional information obtained from the k-th sample. A second difference is determined by subtracting the block information BLK1 included in the actual positional information from the block information BLK1 included in the estimated positional information obtained from the (k−4)-th sample. Subsequently, the second difference is subtracted from the first difference to determine the change of the difference over time.

As illustrated in the example of FIG. 10, when q=4 and bh=4, the change of difference over time can be discriminated as 0, 4, 8, 12 for n=0, 1, 2, 3. However, the change of difference over time is also 0, 4, 8, 12 for n=4, 5, 6, 7. In this case, therefore, it is not possible to discriminate between n=0, 1, 2, 3 and n=4, 5, 6, 7.

In contrast, FIG. 11 is a conceptual diagram illustrating a detection example of the velocity offset according to the present embodiment. In the example of FIG. 11, the positional information from bit 0 to bit 16 is divided into four blocks. As illustrated in the example of FIG. 11, when q=3 and bh=4, the change of difference over time can be discriminated as 3, 6, 9, 12, 15, 2, 5, 8, 11, 14, 1, 4, 7, 10, 13 for n=0, 1, 2, 3, 4, 5, 6, 7, 8, 9, 10, 11, 12, 13, 14, 15. Thus, the change can be discriminated for a wider range than in FIG. 10 when q=4.

Until the comparison of the block information BLK1, elements of the congruence class of the velocity offset modulo $$2^{bh}$$

cannot be distinguished.

Therefore, the comparison of the block information BLK2 which is located one block upper from the block information BLK1 is performed.

First, as illustrated in FIG. 10, a case where part of the data included in the positional information does not overlap the pieces of block information (no overlap) are described.

In this case, assume that the block information BLK2 is obtained in the k-th sample, with x[k] representing the positional information.

$$g = \frac{2^{b_h}}{gcd(q, 2^{b_h})}$$

where $$n = l + gm, 0 \le l \in Z \le g-1, m \in Z$$

At this time, assuming that the velocity offset l, the value of the block information BLK2, which is samples before the current sample, is estimated in accordance with the obtained actual block information BLK2, BLK0 and the estimated block information BLK1. The estimated value is a remainder of the division of the formula (1) below by bh, where $$\lfloor \cdot \rfloor$$

represents a floor function.

$$\left\lfloor \frac{x[k]}{2^{b_2}} \right\rfloor - \left\lfloor \frac{1}{2^{b_2}}(x[k] + 2^{b_1}gm) \right\rfloor + \left\lfloor \frac{x[k-q]}{2^{b_2}} - \frac{(q-1)gm}{2^{b_h}} \right\rfloor \quad (1)$$

The actual block information BLK2 obtained in the (k-q)-th sample is a remainder of the division of the formula (2) below by bh.

$$\left\lfloor \frac{x[k-q]}{2^{b_2}} \right\rfloor \quad (2)$$

Setting $$g = 2^{b_h}$$

then the difference between the formulas (1) and (2) is $-gm$. If the velocity offset occurring from $$gcd(qm, 2^{b_h}) = 1$$

has a range $$n \le 2^{b_1}(g+1)(g-1)$$

(which is halved when a negative velocity offset occurs), m is determined uniquely, so that n can be determined. Meanwhile, if $$g < 2^{b_h}$$

the terms with g in the second and third terms of the formula (1) do not come out of the floor function. According to the nature of the floor function, $$\forall x,y, \lfloor x \rfloor + \lfloor y \rfloor \le \lfloor x+y \rfloor \le \lfloor x \rfloor + \lfloor y \rfloor + 1$$

the following $$n = 1 + gm$$

and $$n = 1 + g(m+1)$$

may not be distinguishable. This narrows the range of the velocity offset capable of being detected and corrected to g which is detectable in the block information BLK1.

Figure 12:
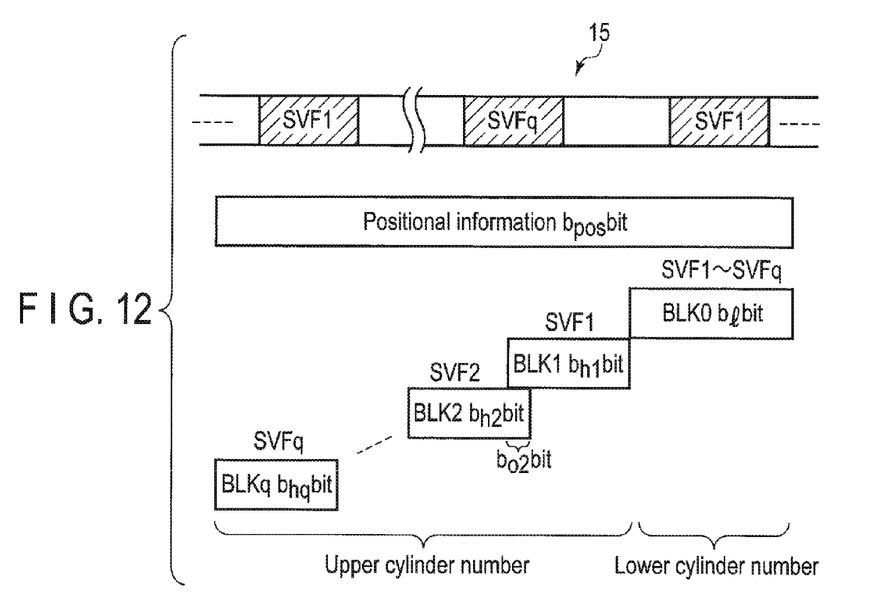
FIG. 12 is a conceptual diagram illustrating an example of a state where part of data included in positional information overlaps multiple block information.

Next, as illustrated in FIG. 12, a case where part of the data included in the positional information overlaps multiple block information (with overlap) is described.

Assume that the bit number that overlaps between the block information BLKi and the block information BLK(i-1) included in the upper cylinder number is boi (where bo1=0).

$$i \in N$$

where N is an integer. Since no difference occurs from the presence or absence of the overlap until the block information BLK1, the block information BLK2 is considered.

Assuming that there is no velocity offset, the value of the block information BLK2, which is g samples before the current sample, is estimated in accordance with the obtained actual block information=2, BLK0 and the estimated block information=1. The estimated value is obtained as a remainder of the division of the formula (3) by bh.

$$\left\lfloor \frac{x[k]}{2^{b_2-b_{o2}}} \right\rfloor - \left\lfloor \frac{1}{2^{b_2-b_{o2}}}(x[k] + 2^{b_1}gm) \right\rfloor + \left\lfloor \frac{x[k-q]}{2^{b_2-b_{o2}}} - \frac{(q-1)gm}{2^{b_h-b_{o2}}} \right\rfloor \quad (3)$$

Thus, setting $$g = 2^{b_h}$$

then the difference between the formulas (3) and (2) is $$-2^{b_{o2}}qm$$

which gives $$gcd(2^{b_{o2}}qm, 2^{b_h}) = 2^{b_{o2}}$$

Therefore, if the range of the velocity offset that is occurring is $$n \le 2^{b_1}\left(\frac{g^2}{2^{b_{o2}}} - 1\right)$$

(which is halved when a negative velocity offset occurs), m is determined uniquely, so that n can be determined. Meanwhile, consider $$gcd(q, 2^{b_h}) = 2^{b_{o2}}$$

that is, $$g = 2^{b_h - b_{o2}}$$

In this case, in proportion to the case where $$g = 2^{b_h}$$

the range of the velocity offset capable of being determined in the block information BLK1 narrows, while the range of the velocity offset capable of being determined in the block information BLK2 increases. Similar to the case where $$g = 2^{b_h}$$

the range up to $$n \le 2^{b_1}\left(\frac{g^2}{2^{b_{o2}}} - 1\right)$$

can be responded.

In the case $$gcd(q, 2^{b_h}) > 2^{b_{o2}}$$

is set, the range of the correctable velocity offset narrows, as in the case of no overlap, down to g which is detectable from the block information BLK1.

In the present embodiment described above, the disk storage device 1 divides the positional information that indicates the position of the disk 2 into multiple block information BLK0 to BLKq, and stores the block information by allocating the block information BLK0 to BLKq to the servo regions SVF1 to SVFq of the disk 2. The disk storage device 1 allocates the upper block information BLK1 to BLKq, which correspond to the upper portion of the positional information of the pieces of the block information BLK0 to BLKq, to the servo regions SVF1 to SVFq at a period equivalent to the division number q. In other words, the disk storage device 1 can obtain the information of upper digits (e.g., bit) of the positional information only in with the divided cycle. Meanwhile, the disk storage device 1 allocates the lower block information BLK0, which corresponds to the lower portion of the position, to all servo regions SVF1 to SVFq. The upper block information BLK1 to BLKq and the lower block information BLK0 stored in the disk 2 is measured by the head 9.

The processor 18 of the main controller 6 includes the state estimating portion 181 that estimates the state of the head 9 including its position, the offset detecting portion 182 that detects that the state estimated by the state estimating portion 181 includes the offset relative to the actual state, and the offset amount estimating portion 183 that estimates the offset amount of the state estimated by the state estimating portion 181 when the offset is detected by the offset detecting portion 182. The processor 18 corrects the state estimated by the state estimating portion 181 in accordance with the offset amount estimated by the offset amount estimating portion 183.

In the present embodiment, the positional information is divided in such a manner that the number of values obtainable in one block of the upper block information BLK1 to BLKq and the division number q become coprime. One example of the division number q that satisfies this condition is an odd number.

The positional information may be divided so that, when the lower side digit of the first upper block information overlaps the upper side digit of the second upper block information located one block lower than the first upper block information, the greatest common divisor of the number of values capable of being taken in one block of the upper block information and the dividing number is not larger than a base to the power of the number of overlapping digits.

Further, the positional information may be divided so that, when the lower side bit of the first upper block information overlaps the upper side bit of the second upper block information located one block lower than the first upper block information, the greatest common divisor of the division number and 2 to the power of the number of bits of the upper block information is not larger than 2 to the power of the number of overlapping bits.

The present embodiment described above can effectively correct the positional information estimated by the state estimating portion 181, and can divide and store the positional information in the servo regions SVF1 to SVFq. Thus, the decrease of the control performance can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position detecting device, comprising:
a detecting portion configured to periodically detect a plurality of pieces of information generated in accordance with positional information, wherein
the positional information is divided into upper digits and lower digits,
the upper digits are further divided into a plurality of pieces of upper digit information equal to the number of the period,
the pieces of the upper digit information are obtained in a predetermined order,
the lower digits are obtained simultaneously with any one of the pieces of the upper digit information, and
the positional information is divided in a manner that the number of values, which are obtainable in one of the pieces of the upper digit information provided by dividing the upper digits, and a division number of the upper digits are coprime.

2. The position detecting device of claim 1, wherein the division number of the upper digits is an odd number.

3. The position detecting device of claim 1, wherein when a lower portion of a first upper digit information of the pieces of the upper digit information overlaps an upper portion of a second upper digit information located one information lower than the first upper digit information, the upper digits are divided in a manner that a greatest common divisor of the number of values, which are obtainable in one of the pieces of the upper digit information, and the division number of the upper digits is not larger than a base to the power of the number of overlapping digits.

4. The position detecting device of claim 1, wherein when a lower-side bit of a first upper digit information of the pieces of the upper digit information overlaps an upper-side bit of a second upper digit information located one information lower than the first upper digit information, the upper digits are divided in a manner that a greatest common divisor of the division number of the upper digits and 2 to the power of the number of bits of the upper digit information is not larger than 2 to the power of the number of overlapping bits.

5. A position control device configured to execute positioning control in accordance with the plurality of pieces of information detected by the position detecting device of claim 1.

6. A disk storage device, comprising:
a disk configured to periodically store a plurality of pieces of servo information, which are generated in accordance with positional information for detecting a radial position, in a plurality of servo regions arranged in a circumference direction; and a controller configured to control a relative position between the disk and a head to control write and read of data to and from the disk, wherein the positional information is divided into upper digits and lower digits, the upper digits are further divided into a plurality of pieces of upper digit information equal to the number of the period of the servo regions in the circumferential direction, each piece of the upper digit information being allocated periodically to a corresponding servo region of the plurality of servo regions, the lower digits are allocated to each of the servo regions, and the positional information stored in the disk is divided in a manner that the number of values, which are obtainable in one of the pieces of the upper digit information provided by dividing the upper digits, and a division number of the upper digits are coprime.

7. The disk storage device of claim 6, wherein the controller includes a state estimating portion configured to estimate a state including a position of the head, an offset detecting portion configured to detect that the state estimated by the state estimating portion has offset relative to an actual state, an offset amount estimating portion configured to estimate an offset amount of the state estimated by the state estimating portion when the offset is detected by the offset detecting portion, and a state correcting portion configured to correct the state estimated by the state estimating portion in accordance with the offset amount estimated by the offset amount estimating portion.

8. The disk storage device of claim 7, further comprising:

an offset correcting portion configured to correct the offset detected by the offset detecting portion, wherein the state estimating portion estimates the state using a corrected offset corrected by the offset correcting portion.

9. A position detecting method, comprising:

periodically detecting a plurality of pieces of information generated in accordance with positional information, wherein the positional information is divided into upper digits and lower digits, the upper digits are further divided into a plurality of pieces of upper digit information equal to the number of the period, the pieces of the upper digit information are obtained in a predetermined order, the lower digits are obtained simultaneously with any one of the pieces of the upper digit information, and the positional information is divided in a manner that the number of values, which are obtainable in one of the pieces of the upper digit information provided by dividing the upper digits, and a division number of the upper digits are coprime.

10. The position detecting method of claim 9, wherein the division number of the upper digits is an odd number.

11. The position detecting method of claim 9, wherein when a lower portion of a first upper digit information of the pieces of the upper digit information overlaps an upper portion of a second upper digit information located one information lower than the first upper digit information, the upper di its are divided in a manner that a greatest common divisor of the number of values, which are obtainable in one of the pieces of the upper digit information, and the division number of the upper digits is not larger than a base to the power of the number of overlapping digits.

12. The position detecting method of claim 9, wherein when a lower-side bit of a first upper digit information of the pieces of the upper digit information overlaps an upper-side bit of a second upper digit information located one information lower than the first upper digit information, the upper digits are divided in a manner that a greatest common divisor of the division number of the upper digits and 2 to the power of the number of bits of the upper digit information is not larger than 2 to the power of the number of overlapping bits.

13. A position control method configured to execute positioning control in accordance with the plurality of pieces of information detected by the position detecting method of claim 9.

* * * * *